US012353184B2

(12) United States Patent
Masui et al.

(10) Patent No.: US 12,353,184 B2
(45) Date of Patent: Jul. 8, 2025

(54) PROGRAMMABLE CONTROLLER, PROGRAMMABLE CONTROLLER SYSTEM, AND RECORDING MEDIUM

(71) Applicant: Mitsubishi Electric Corporation, Tokyo (JP)

(72) Inventors: Yasuo Masui, Nagoya (JP); Tomoaki Takagi, Tokyo (JP); Ryoichi Sasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 12 days.

(21) Appl. No.: 18/574,316

(22) PCT Filed: Aug. 5, 2021

(86) PCT No.: PCT/JP2021/029049
§ 371 (c)(1),
(2) Date: Dec. 27, 2023

(87) PCT Pub. No.: WO2023/012959
PCT Pub. Date: Feb. 9, 2023

(65) Prior Publication Data
US 2024/0302810 A1    Sep. 12, 2024

(51) Int. Cl.
*G05B 19/05*    (2006.01)
(52) U.S. Cl.
CPC ......... *G05B 19/054* (2013.01); *G05B 19/058* (2013.01); *G05B 2219/13142* (2013.01)
(58) Field of Classification Search
CPC .............. G05B 19/054; G05B 19/058; G05B 2219/13142
See application file for complete search history.

(56) References Cited

U.S. PATENT DOCUMENTS

2013/0314726 A1* 11/2013 Nishimura ............ G06F 3/1281
358/1.6

FOREIGN PATENT DOCUMENTS

EP    1538564 A2 *  6/2005  ............. G06Q 40/04
JP    2004-302880 A   10/2004
(Continued)

OTHER PUBLICATIONS

English translation of WO 2016/158713 A1 (Year: 2016).*
(Continued)

*Primary Examiner* — Henry Tsai
*Assistant Examiner* — John B Roche
(74) *Attorney, Agent, or Firm* — XSENSUS LLP

(57) ABSTRACT

A programmable controller includes a parameter manager to manage a parameter including an operation mode setting indicating whether an operation mode of the programmable controller is an active mode or a debug mode, and a character string data outputter to output character string data based on a message output command included in a program in the programmable controller. The message output command includes a first argument specifying whether a command is to be executed when the operation mode is the active mode or to be executed when the operation mode is the debug mode. The character string data outputter outputs or does not output the character string data to a preset destination, based on a result of a comparison between the operation mode setting and the first argument.

20 Claims, 10 Drawing Sheets

(56) References Cited

FOREIGN PATENT DOCUMENTS

JP       2007-128363 A     5/2007
WO     WO-2016158713 A1 * 10/2016   ......... H04N 1/00835

OTHER PUBLICATIONS

International Search Report and Written Opinion mailed on Sep. 28, 2021, received for PCT Application PCT/JP2021/029049, filed on Aug. 5, 2021, 8 pages including English Translation.

* cited by examiner

PROGRAMMABLE CONTROLLER, PROGRAMMABLE CONTROLLER SYSTEM, AND RECORDING MEDIUM

CROSS-REFERENCE TO RELATED APPLICATION

This application is a national phase application, under 35 U.S.C. § 371, based on International Patent Application No. PCT/JP2021/029049, filed Aug. 5, 2021, the entire contents of which are incorporated herein by reference.

TECHNICAL FIELD

The present disclosure relates to a programmable controller, a programmable controller system, and a program.

BACKGROUND ART

A programmable controller that is a programmable logic controller (PLC) executes commands in a program to perform various types of processing, including controlling a device serving as a control target and acquiring detection signals from a device serving as a detection target.

Development of a programmable controller involves debugging for an intended operation of a program generated by a user. A debugging method includes preliminarily incorporating commands for network communication into a program for a programmable controller, and outputting an appropriate message to a terminal under development connected to a network (for example, Patent Literature 1).

The programmable controller described in Patent Literature 1 provides a net command for network communication to a network interface to transmit a message specified by the net command to a destination specified by the net command. Thus, the programmable controller can cause any device connected to the network to display a message, and flexibly change the conditions for transmitting a message or the content and the destination of the message.

CITATION LIST

Patent Literature

Patent Literature 1: Unexamined Japanese Patent Application Publication No. 2004-302880

SUMMARY OF INVENTION

Technical Problem

The programmable controller described in Patent Literature 1 can be debugged during development using a net command. However, after the debugging, portions used for the net command for the debugging are to be deleted to change the program into a program for activating the programmable controller. In addition, when a trouble occurs, the net command used for debugging is to be rewritten.

When a debugging message is not deleted, the debugging message remains with a message used during activation, and thus the content of the messages are less identifiable. In addition, communicating the debugging message unused during activation may use a large portion of the network communication bandwidth.

In the above circumstances, an objective of the present disclosure is to provide a programmable controller, a programmable controller system, and a program that can output appropriate messages during debugging and activation.

Solution to Problem

To achieve the above objective, a programmable controller according to the present disclosure includes a parameter manager to manage a parameter including an operation mode setting indicating whether an operation mode of the programmable controller is an active mode or a debug mode, and a character string data outputter to output character string data based on a message output command included in a program in the programmable controller. The message output command includes a first argument specifying whether a command is to be executed when the operation mode is the active mode or to be executed when the operation mode is the debug mode. The character string data outputter outputs the character string data to a preset destination when the operation mode setting is set to indicate the debug mode, outputs the character string data to the preset destination when the operation mode setting is set to indicate the active mode and the first argument is a value corresponding to the active mode, and does not output the character string data when the operation mode setting is set to indicate the active mode and the first argument is a value corresponding to the debug mode.

Advantageous Effects of Invention

According to the present disclosure, content of processing is changed in accordance with the operation mode setting of the parameter and the first argument for the operation mode included in the message output command. Thus, an appropriate message can be output during debugging and activation.

DESCRIPTION OF EMBODIMENTS

Embodiment 1

Figure 1:
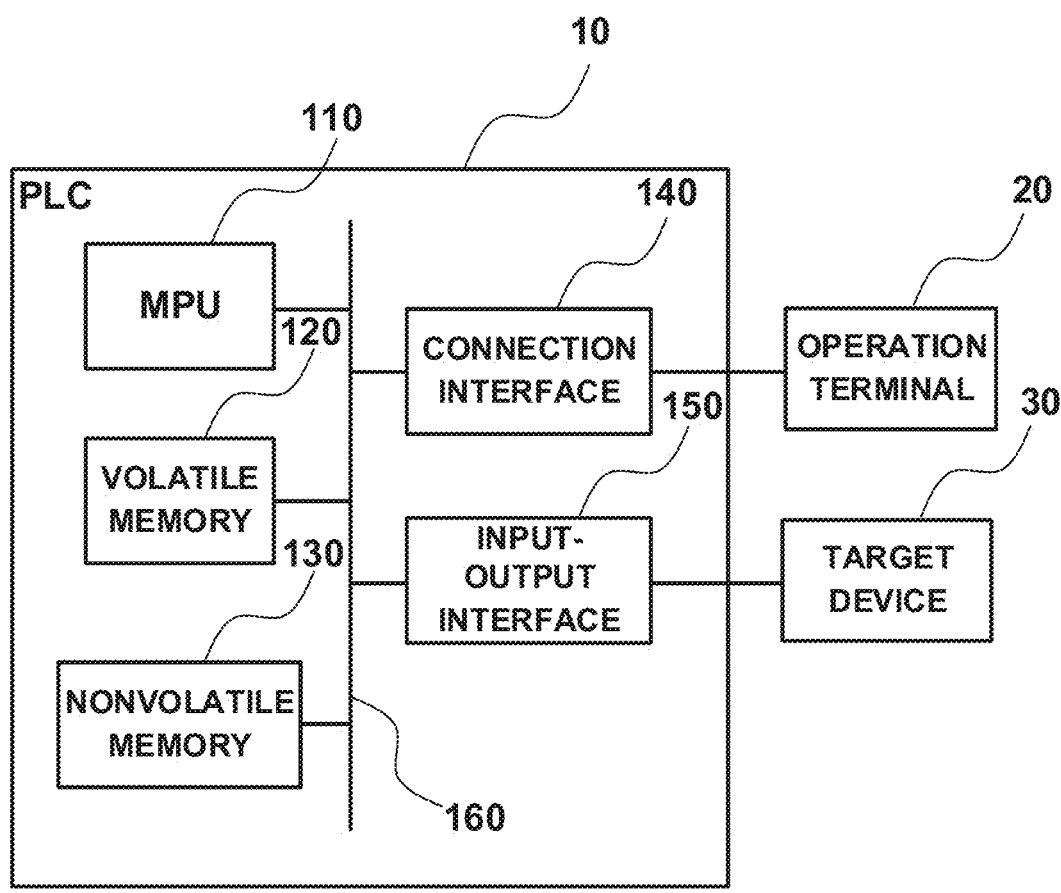
FIG. 1 is a block diagram illustrating an example of hardware configuration of a programmable controller according to Embodiment 1.

Embodiment 1 of the present disclosure is described in detail below with reference to the drawings. In the drawings, components that are the same or equivalent are assigned the same reference sign.

FIG. 1 is a block diagram illustrating an example of hardware configuration of a programmable controller (a programmable logic controller that is hereafter referred to as a PLC) 10 according to Embodiment 1. The PLC 10 executes a command in a program to provide a control signal to a target device 30 serving as a control target to control the target device 30, and acquires a detection signal from the target device 30 serving as a detection target. Examples of the target device 30 serving as a control target include a servomechanism, an actuator, an electromagnetic valve, and an indicator light. Examples of the target device 30 serving as a detection target include a sensor and a switch.

As illustrated in FIG. 1, the PLC 10 includes a microprocessing unit (MPU) 110 that performs overall control over the PLC 10, a volatile memory 120 that temporarily stores data when the MPU executes a program, and a nonvolatile memory 130 that stores various types of programs and data. The PLC 10 also includes a connection interface 140 for connecting an operation terminal 20 and an input-output interface 150 for connecting the target device 30.

The volatile memory 120, the nonvolatile memory 130, the connection interface 140, and the input-output interface 150 are connected to the MPU 110 with a bus 160 to communicate with the MPU 110.

The volatile memory 120 is a work memory with which data is readable and writable quickly during computation performed by the MPU 110, and is, for example, a random-access memory (RAM).

The nonvolatile memory 130 stores programs for implementing various functions of the PLC 10, and data including parameters used to execute the programs. The nonvolatile memory 130 stores, for example, firmware and user programs executed by the MPU 110. Examples of the nonvolatile memory 130 include an electrically erasable programmable read-only memory (EEPROM), a nonvolatile semiconductor memory including a flash memory, a magnetic disk, and an optical disk.

The user program is developed by a user using, for example, a sequential function chart (SFC). In the present embodiment, the user program causes the MPU 110 to implement various functions including the function of controlling or detecting the target device 30 and the function of executing a message output command. The message output command is similar to a printf function in the C language, and thus, is also referred to as a printf command in the present embodiment.

The connection interface 140 allows the PLC 10 to communicate with the operation terminal 20, and transmits data output by the MPU 110 to the operation terminal 20, or passes data received from the operation terminal 20 to the MPU 110. The connection interface 140 is any interface corresponding to the interface in the operation terminal 20, for example, a universal serial bus (USB) interface or a recommended standard (RS) 232C interface.

In the operation terminal 20, a dedicated application program including the function of forming the user program is installed. For example, the operation terminal 20 is a personal computer. The operation terminal 20 includes the function of managing the PLC 10 including inputting or changing parameters stored in the nonvolatile memory 130. The operation terminal 20 also includes the function of displaying a message generated by the MPU 110 executing a message output command.

The input-output interface 150 allows the PLC 10 to communicate with the target device 30, and transmits the data output from the MPU 110 to the target device 30, or passes data received from the target device 30 to the MPU 110. The input-output interface 150 is any interface corresponding to an interface included in the target device 30 or communication means for the target device 30. The input-output interface 150 is, for example, an interface for an industrial open network including CC-Link (registered trademark) or EtherCAT (registered trademark), or a bus interface.

The MPU 110 executes various programs stored in the nonvolatile memory 130 to implement various functions of the PLC 10. For example, the MPU 110 executes a user program stored in the nonvolatile memory 130 to perform computation using data received from the target device 30 serving as a detection target, and provides a control signal based on a value indicating the computation result to the target device 30 serving as a control target.

Figure 2:
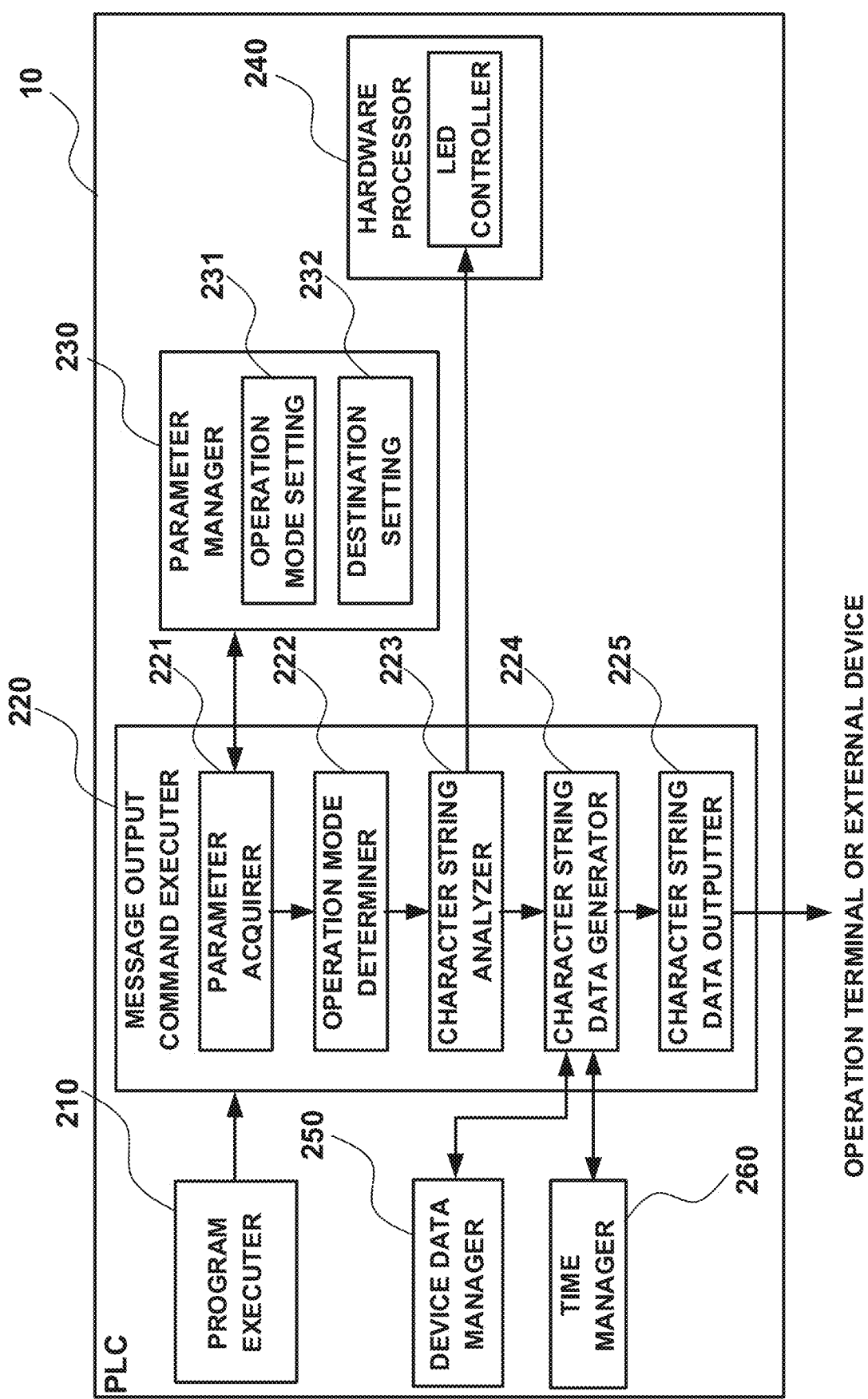
FIG. 2 is a block diagram illustrating an example of functional configuration of the programmable controller according to Embodiment 1.

In the present embodiment, the PLC 10 executes the user program to implement the function of executing a message output command in addition to the function associated with the target device 30. FIG. 2 is a block diagram illustrating an example of functional configuration of the PLC 10. As illustrated in FIG. 2, the PLC 10 functions as a program executer 210, a message output command executer 220, a parameter manager 230, a hardware processor 240, a device data manager 250, and a time manager 260.

The program executer 210 reads the user program from the nonvolatile memory 130, and sequentially executes commands in the user program from the first to the last commands. The message output command executer 220 executes the message output command included in the user program. The message output command is written with, for example, a command starting from printf.

The parameter manager 230 stores various parameters associated with the PLC 10 in the nonvolatile memory 130, and passes the parameters to the message output command executer 220 in response to a request from the message output command executer 220. The hardware processor 240 performs predetermined processing for operating hardware based on notification data output from the message output command executer 220. The hardware is, for example, a light-emitting diode (LED) or a speaker. The hardware processor 240 lights the LED or causes the speaker to output sound.

The device data manager 250 acquires, from each device, device data that is data about the devices in the PLC 10 or the target device 30 connected to the PLC 10 with the input-output interface 150, and stores the device data into the volatile memory 120. The device data manager 250 then passes the device data to the message output command executer 220 in response to a request from the message output command executer 220. The time manager 260 outputs time in the PLC 10 in response to a request from the message output command executer 220.

The configuration of the message output command executer 220 is described in detail. As illustrated in FIG. 2, the message output command executer 220 includes a parameter acquirer 221, an operation mode determiner 222, a character string analyzer 223, a character string data generator 224, and a character string data outputter 225.

The parameter acquirer 221 acquires an operation mode setting 231 and a destination setting 232 from the parameter manager 230. The operation mode setting 231 is a parameter indicating whether the operation mode of the PLC 10 is an active mode or a debug mode. The destination setting 232 is a parameter indicating a destination of the message based on the message output command.

The parameters managed by the parameter manager 230 can be set or changed as appropriate. For example, the user switches, with operation input on the operation terminal 20, the operation mode setting 231 to the active mode to normally operate the PLC 10, and to the debug mode to start debugging of the PLC 10. In some embodiments, the operation mode setting 231 can be switched by any target device 30 including a switch connected to the PLC 10 with the input-output interface 150.

The destination setting 232 specifies any device connected to the PLC 10 with an interface included in the PLC 10 as a message destination. For example, the operation terminal 20 or another external device connected to the PLC 10 with the connection interface 140 is specified as a destination. In some embodiments, an external terminal connected to a network with a communication interface for network connection or connected to a bus with a bus interface may be specified as a destination. In some embodiments, a card connected with a card interface for card connection may be specified as a destination.

The operation mode determiner 222 compares the operation mode setting 231 acquired by the parameter acquirer 221 with a first argument indicating the operation mode included in the message output command, and determines whether to continue the processing of the message output command based on a result of the comparison. The first argument included in the message output command specifies whether a command is to be executed when the operation mode is the active mode or to be executed when the operation mode is the debug mode.

More specifically, the operation mode determiner 222 ends the processing of the message output command in the case of disagreement, as a result of the comparison, due to the operation mode setting 231 acquired by the parameter acquirer 221 being the active mode and the operation mode specified by the first argument in the message output command being the debug mode. In contrast, in the case of agreement, as a result of the comparison, due to the operation mode setting 231 acquired by the parameter acquirer 221 being the active mode and the operation mode specified by the first argument in the message output command being the active mode, or in the case where the operation mode setting 231 acquired by the parameter acquirer 221 is the debug mode, the operation mode determiner 222 continues the processing of the message output command.

The character string analyzer 223 analyzes whether the character string serving as a second argument in the message output command includes a specific character string. The character string analyzer 223 notifies the hardware processor 240 that the processing is to be performed when the character string includes the specific character string, and does not provide a notification when the character string includes no specific character string.

The character string data generator 224 generates a character string based on the message output command. When the character string serving as the second argument in the message output command includes a device data output request, the character string data generator 224 acquires device data from the device data manager 250, and generates a character string including the acquired device data.

When the character string serving as the second argument in the message output command includes no device data output request, the character string data generator 224 generates a character string including no device data. The character string data generator 224 then acquires time data from the time manager 260, converts the time data to a character string, and concatenates the character string serving as the second argument, the character string serving as the device data, and the character string serving as the time data to generate character string data to be output.

The character string data outputter 225 identifies the destination setting 232 acquired from the parameter manager 230, and transmits the character string data generated by the character string data generator 224 to a destination indicated by the destination setting 232.

Figure 3:
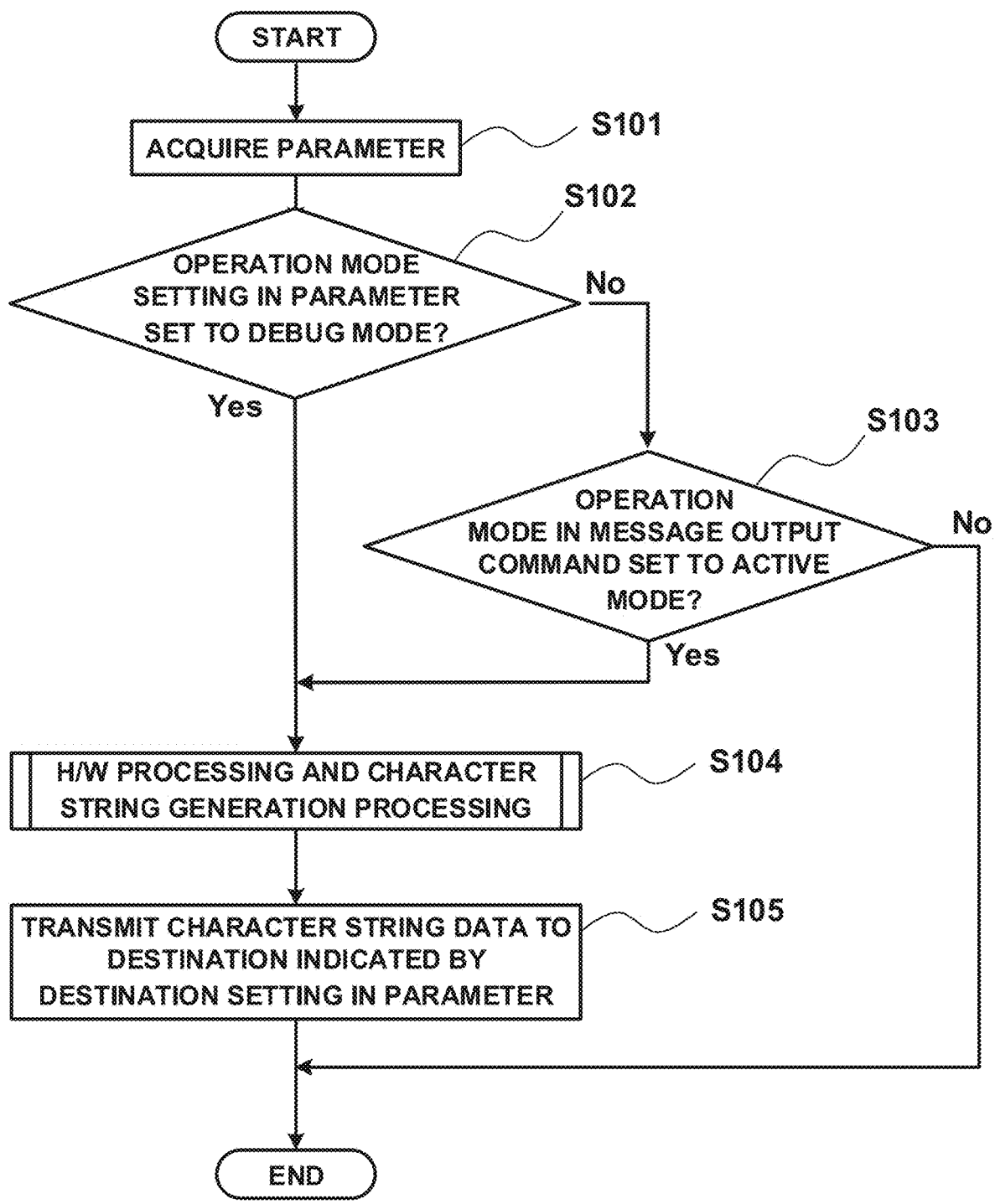
FIG. 3 is a flowchart of message output command execution processing.
Figure 4:
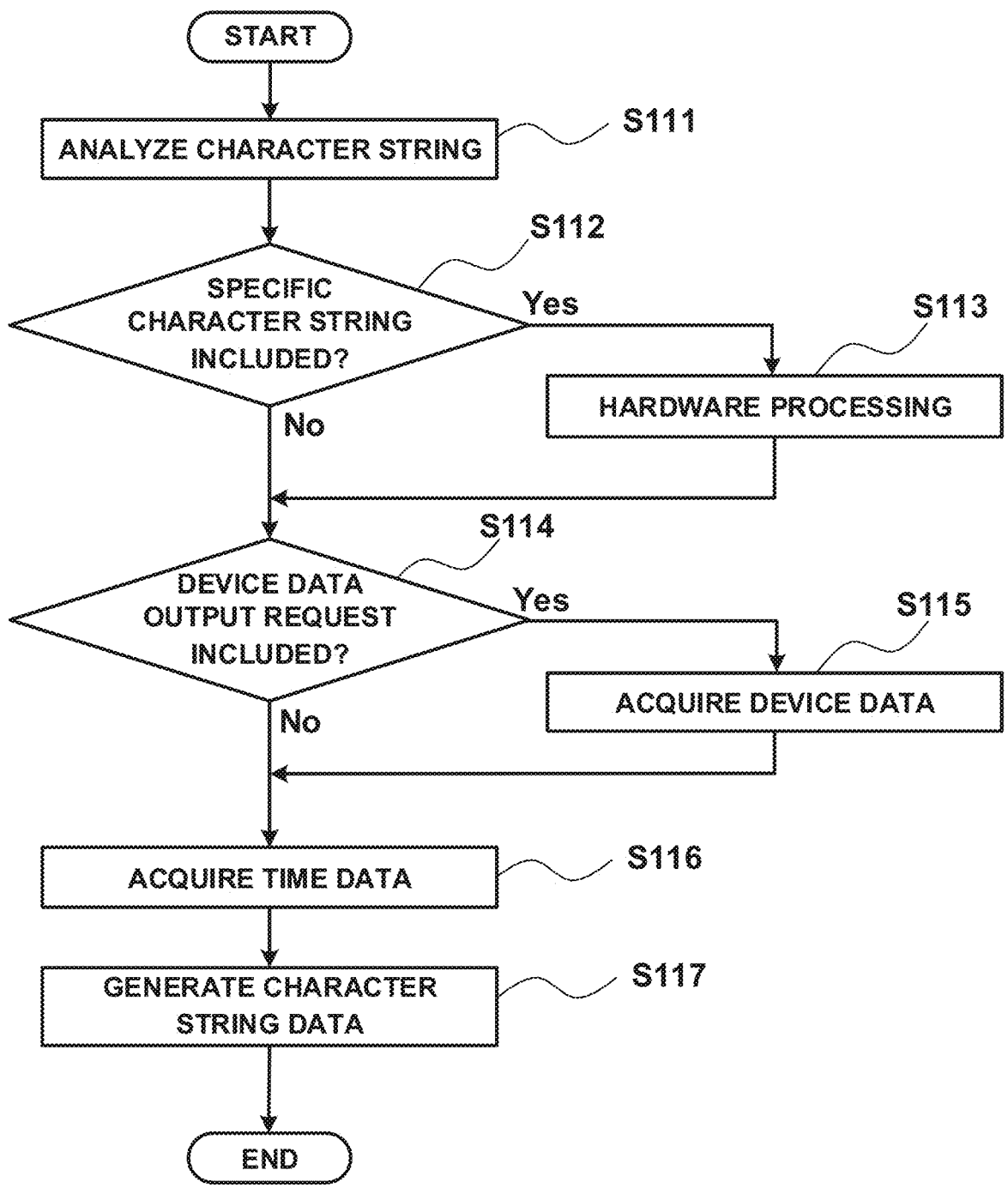
FIG. 4 is a flowchart of hardware processing and character string generation processing.

The operation of the PLC 10 with the above configuration is described with reference to the flowcharts illustrated in FIGS. 3 and 4. FIG. 3 is a flowchart of the message output command execution processing, and FIG. 4 is a flowchart of hardware processing and character string generation processing.

The program executer 210 in the PLC 10 executes the user program, and sequentially processes commands. The message output command executer 220 performs the processing in the flowchart in FIG. 3 in response to the message output command. First, the parameter acquirer 221 acquires various parameters including the operation mode setting 231 and the destination setting 232 from the parameter manager 230 (step S101).

The operation mode determiner 222 then compares the operation mode setting 231 included in the parameters acquired by the parameter acquirer 221 with the first argument indicating the operation mode included in the message output command. When the operation mode setting 231 in the parameters acquired by the parameter acquirer 221 is the debug mode (Yes in step S102), the hardware processing (described as H/W processing in the figure) and the character string generation processing are performed (step S104).

When the operation mode setting 231 in the parameters acquired by the parameter acquirer 221 is the active mode (No in step S102), a determination is made on whether the operation mode corresponding to the first argument in the message output command is the active mode and agrees with the operation mode setting 231 in the parameters (step S103).

When the operation mode corresponding to the first argument in the message output command is the active mode and agrees with the operation mode setting 231 in the parameters (Yes in step S103), the hardware processing and the character string generation processing are performed (step S104). When the operation mode corresponding to the first argument in the message output command is the debug mode and disagrees with the operation mode setting 231 in the parameters (No in step S103), the processing ends.

The hardware processing and the character string generation processing in step S104 are described with reference to the flowchart in FIG. 4. First, the character string analyzer 223 analyzes whether the character string serving as the second argument in the message output command includes a specific character string (step S111). When the character string includes the specific character string (Yes in step S112), the character string analyzer 223 notifies the hardware processor 240 that the processing is to be performed.

The hardware processor 240 performs the processing for operating the hardware based on notification data output from the message output command executer 220 (step S113). For example, the hardware is an LED or a speaker, and the hardware processor 240 lights the LED or causes the speaker to output sound. When the character string analyzer 223 determines that the character string serving as the second argument in the message output command includes no specific character string (No in step S112), the character string analyzer 223 does not provide a notification to the hardware processor 240.

The character string data generator 224 then generates character string data based on the message output command. More specifically, the character string analyzer 223 first analyzes whether the character string serving as the second argument in the message output command includes a device data output request (step S114).

When the character string serving as the second argument in the message output command includes the device data output request (Yes in step S114), the character string data generator 224 acquires device data from the device data manager 250 (step S115), and the processing advances to step S116. When the character string serving as the second argument in the message output command includes no device data output request (No in step S114), the processing advances to step S116.

The character string data generator 224 acquires time data from the time manager 260 (step S116), converts the time data to a character string, and concatenates the character string serving as the second argument, the character string serving as the device data, and the character string serving as the time data to generate character string data to be output (step S117).

After the hardware processing and the character string generation processing are performed (step S104) as described above, the character string data outputter 225 transmits the character string data generated by the character string data generator 224 to a destination indicated by the destination setting 232 in the parameters acquired in step S101 (step S105).

Figure 5A:
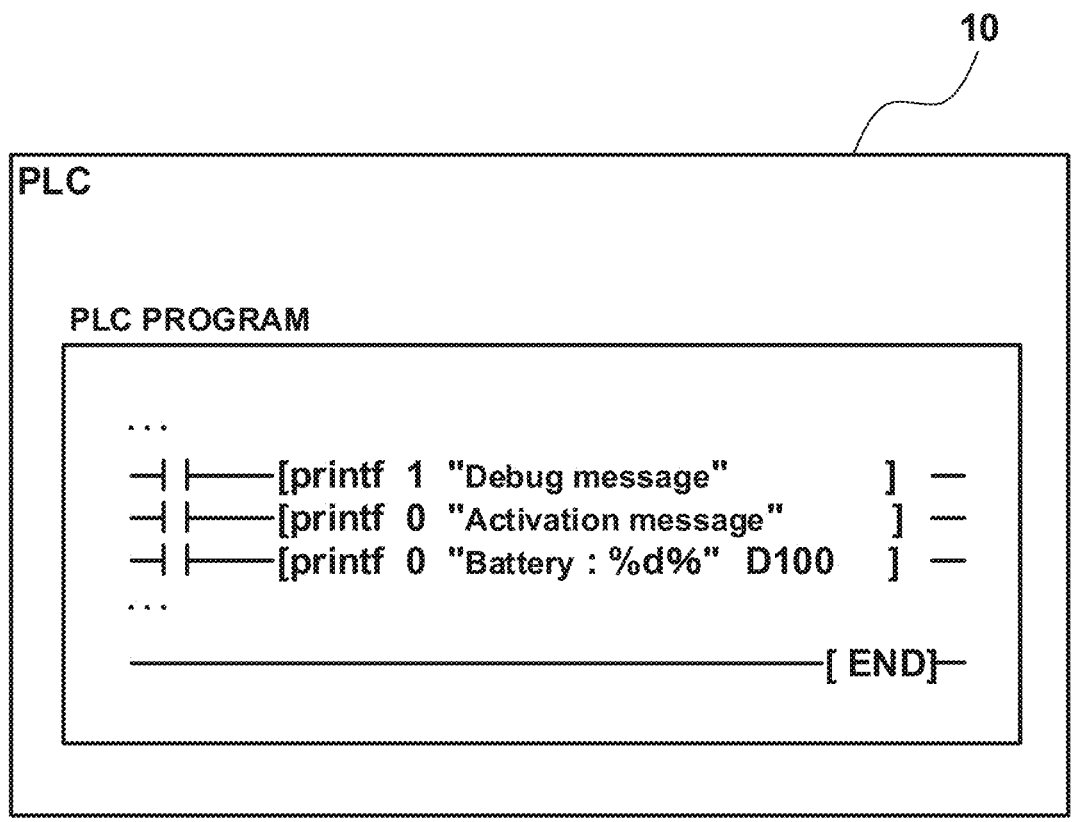
FIG. 5A illustrates an example of a message output command in a PLC program.
Figure 5B:
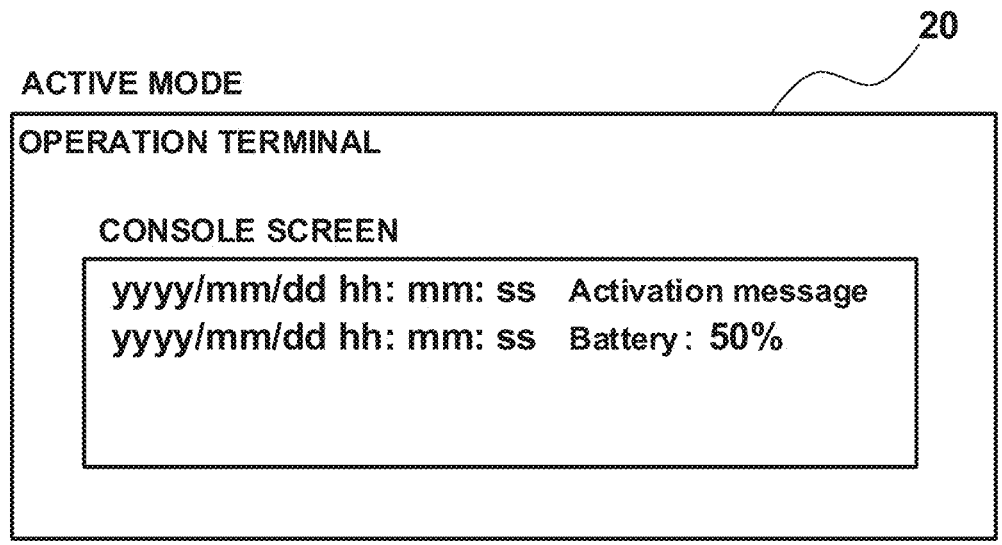
FIG. 5B illustrates an example of message display in an active mode.
Figure 5C:
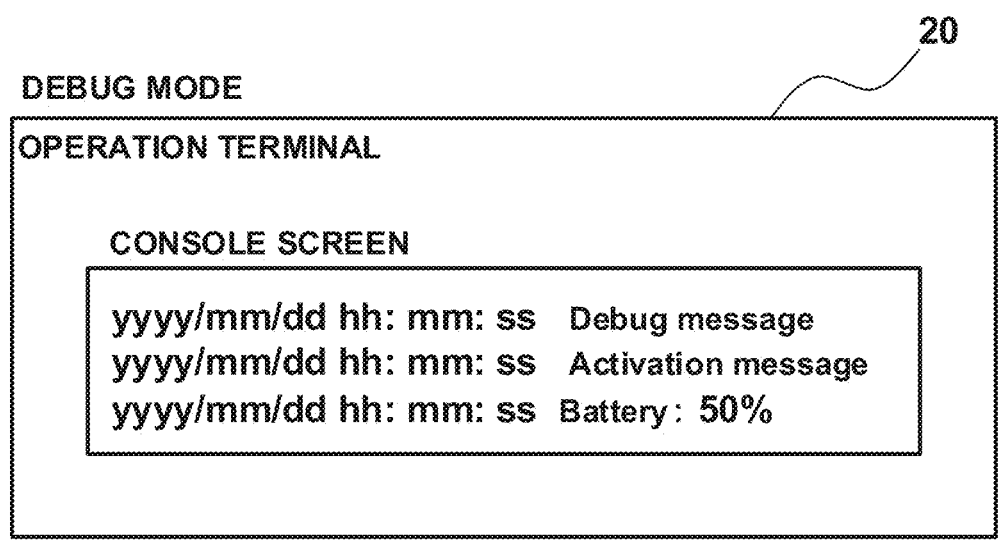
FIG. 5C illustrates an example of message display in a debug mode.

FIG. 5A illustrates an example of the message output command in the program in the PLC 10. FIG. 5B illustrates an example of message display made in response to the message output command in FIG. 5A in the active mode. FIG. 5C illustrates an example of message display made in response to the message output command in FIG. 5A in the debug mode.

In FIG. 5A, a message output command is defined as [printf<first argument><second argument>]. The first argument specifies whether a command is to be executed when the operation mode is the active mode or to be executed when the operation mode is the debug mode. The second argument includes at least one of a specific character string for performing the hardware processing, a character string to be displayed as is, or a character string for requesting an output of the device data.

When the operation mode setting 231 in the parameters is the active mode, among the three message output commands in FIG. 5A, the message output commands with the first argument being "0" alone are executed, with "0" indicating that the command is to be executed when the operation mode is the active mode. Thus, as illustrated in FIG. 5B, the console screen in the operation terminal 20 displays a message including time and a character string of "Activation message" for the second message output command, and a message including time, a character string of "Battery:", and device data of "50%" for the third message output command.

When the operation mode setting 231 in the parameters is the debug mode, all the three message output commands in FIG. 5A are executed independently of the first argument. Thus, as illustrated in FIG. 5C, the console screen in the operation terminal 20 displays a message including time and a character string of "Debug message" for the first message output command, a message including time and a character string of "Activation message" for the second message output command, and a message including time, a character string of "Battery:", and device data of "50%" for the third message output command.

As described above, in the PLC 10 according to the present embodiment, the parameter manager 230 manages the operation mode setting 231 indicating whether the operation mode of the PLC 10 is the active mode or the debug mode. The message output command includes a first argument specifying whether a command is to be executed when the operation mode is the active mode or to be executed when the operation mode is the debug mode. The character string data outputter 225 in the message output command executer 220 outputs character string data to a predetermined destination when the operation mode setting 231 in the parameters is the debug mode. When the operation mode setting 231 in the parameters is the active mode, the character string data outputter 225 outputs character string data for the first argument being a value corresponding to the active mode and does not output character string data for the first argument being a value corresponding to the debug mode.

This allows displaying of all the messages in the debug mode and a message for the active mode alone in the active mode, eliminating displaying of unused messages for the debug mode during activation. This also eliminates, in generating a final program, deleting of portions including message output commands for debugging and further eliminates rewriting of the message output commands previously used for debugging to handle troubles.

The processing for the message output command in the present embodiment may be applied to an engineering tool installed in a PLC design computer. This reduces the volume of the program to be executed by the engineering tool.

In the present embodiment, the parameter manager 230 manages parameters including the destination setting 232 indicating the message destination, and the character string data outputter 225 outputs character string data to the destination indicated by the destination setting 232 in the parameter.

The destination setting 232 included in the parameter allows the destination of the message output command to be changed without changes in the user program. For example, to temporarily view a message in real time, the destination can be set to the operation terminal 20 connected to the connection interface 140. This allows viewing of the message through the console screen. To store a message while a program is being executed for a long time, the destination can be set to a network drive connected to a communication interface for network connection, and the message can be stored into any file on the network drive.

In the present embodiment, the character string analyzer 223 causes the hardware processor 240 to perform the hardware processing when the message output command includes a specific character string.

Thus, for example, a message output command can be used to detect an error defined by a user and display the error with the LED. This structure eliminates an annunciator, and thus eliminates the correspondence between the annunciator and the user program. This structure can specify a portion including an error using the message output command.

In the present embodiment, when the character string serving as the second argument in the message output command includes a device data output request, the character string data generator 224 acquires device data from the device data manager 250, and generates character string data including the device data.

This structure can display the character string, the device data, and the command execution time in association with one another, thus eliminating a display or a dedicated tool including an engineering tool.

Embodiment 2

With reference to the drawings, Embodiment 2 of the present disclosure is described in detail. In the drawings, components that are the same or equivalent are assigned the same reference sign.

As in Embodiment 1, a PLC according to Embodiment 2 controls the target device 30 or acquires a detection signal from the target device 30, and further transmits and receives character string data to and from other PLCs. Multiple PLCs according to the present embodiment are denoted with a PLC-A 11, a PLC-B 12, and a PLC-C 13.

Figure 6:
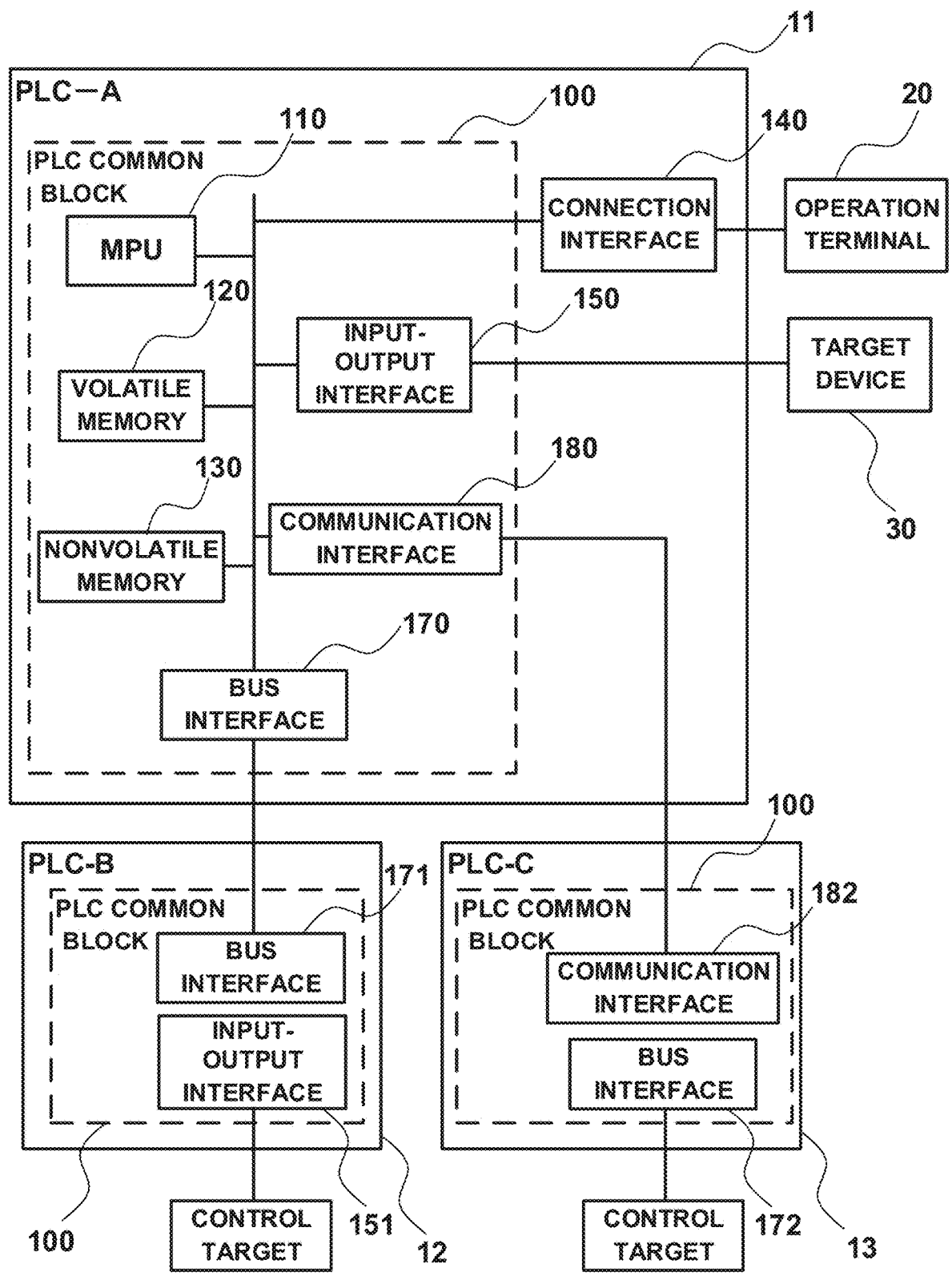
FIG. 6 is a block diagram of illustrating an example of hardware configuration of a programmable controller according to Embodiment 2.

As illustrated in FIG. 6, the PLC-A 11, the PLC-B 12, and the PLC-C 13 each include a PLC common block 100. As in the PLC 10 according to Embodiment 1, each PLC common block 100 includes an MPU 110, a volatile memory 120, and a nonvolatile memory 130. The PLC-A 11 also includes a connection interface 140 for connecting the operation terminal 20, an input-output interface 150 for connecting the target device 30, a bus interface 170 for connecting the PLC-B 12, and a communication interface 180 for connecting the PLC-C 13.

The interfaces that connect the PLC-A 11, the PLC-B 12, and the PLC-C 13 in FIG. 6 to one another and the interfaces that connect the PLC-A 11, the PLC-B 12, and the PLC-C 13 to the operation terminal 20 or the target device 30 are mere examples, and any interfaces in any number may be selected as appropriate.

Figure 7:
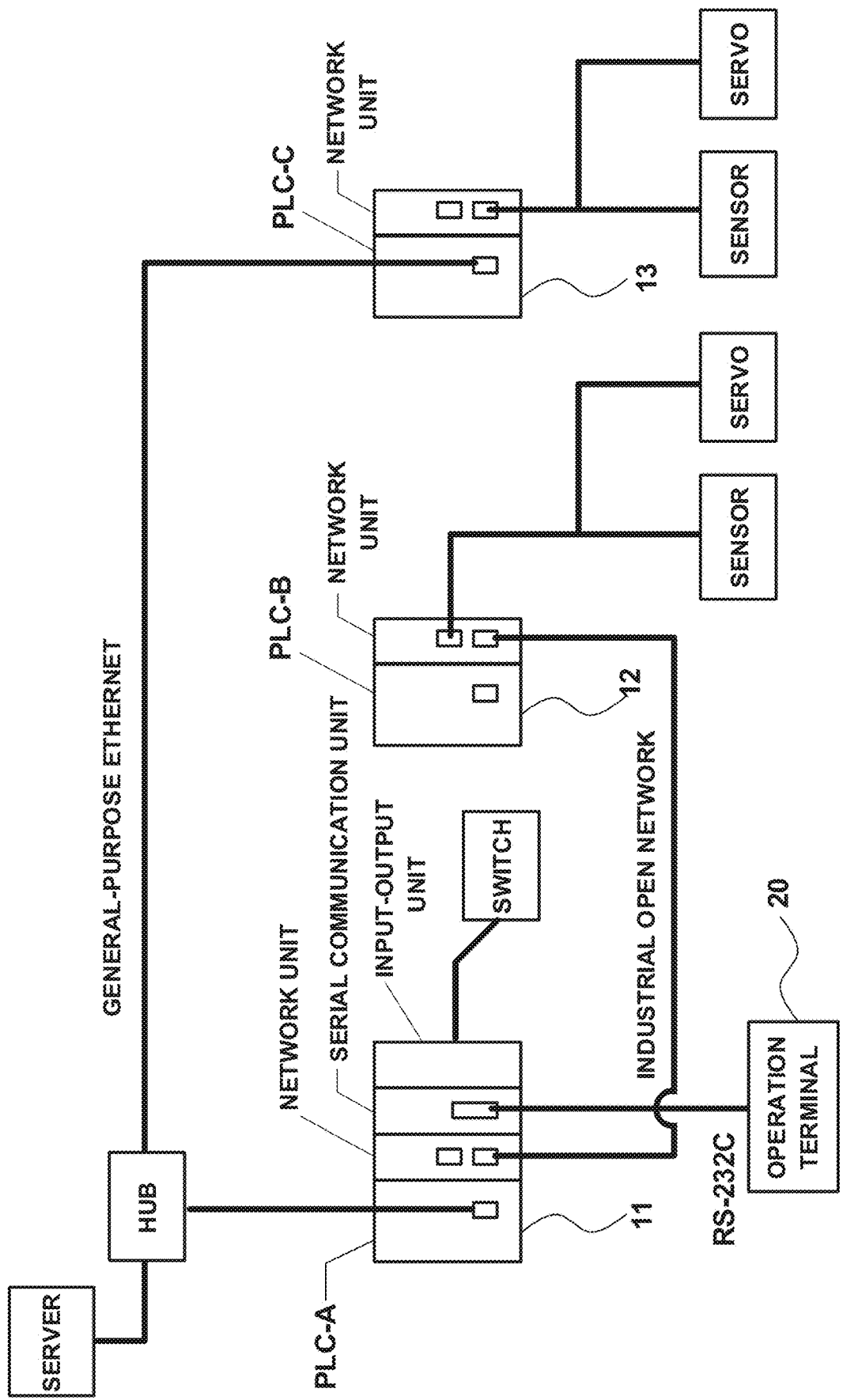
FIG. 7 is a block diagram illustrating an example of configuration of a programmable controller system according to Embodiment 2.

FIG. 7 simply illustrates the network configuration of a programmable controller system including the PLC-A 11, the PLC-B 12, and the PLC-C 13. In FIG. 7, the PLC-A 11 and the PLC-B 12 are connected to each other with an industrial open network, the PLC-A 11 and the PLC-C 13 are connected to each other with a general-purpose ethernet, and the PLC-A 11 and the operation terminal 20 are connected to each other with serial communication in accordance with RS-232C.

In the present embodiment, as illustrated in FIG. 6, the PLC-A 11 is connected to the operation terminal 20 with the connection interface 140, to the target device 30 with the input-output interface 150, to the PLC-B 12 with the bus interface 170, and to the PLC-C 13 with the communication interface 180.

The MPU 110, the volatile memory 120, and the nonvolatile memory 130 in the PLC common block 100 have the same structures as in Embodiment 1, and thus are not described.

Figure 8:
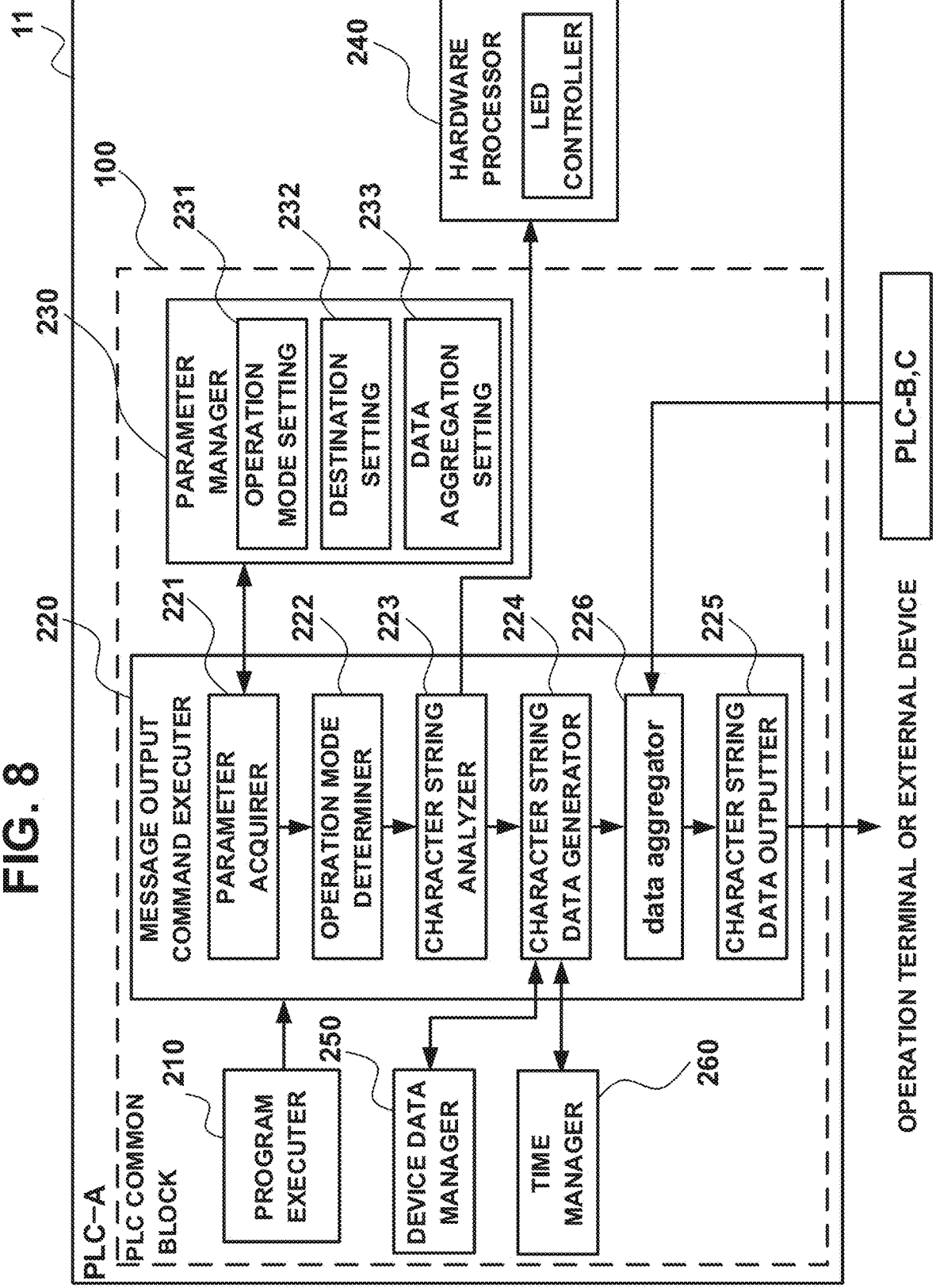
FIG. 8 is a block diagram illustrating an example of functional configuration of the programmable controller according to Embodiment 2.

In the present embodiment, the PLC-A 11, the PLC-B 12, and the PLC-C 13 execute user programs to implement the function of executing a message output command in addition to the function of controlling the target device 30 or acquiring a detection signal from the target device 30. FIG. 8 is a block diagram illustrating an example of functional configuration of the PLC-A 11. As illustrated in FIG. 8, the PLC-A 11 includes a program executer 210, a message output command executer 220, a parameter manager 230, a hardware processor 240, a device data manager 250, and a time manager 260.

The program executer 210 reads the user program from the nonvolatile memory 130, and sequentially executes commands in the user program from the first to the last commands. The message output command executer 220 executes a message output command included in the user program. The message output command is written with, for example, a command starting from printf.

The parameter manager 230 stores various parameters associated with the PLC-A 11, and passes the parameters to the message output command executer 220 in response to a request from the message output command executer 220. The parameters stored by the parameter manager 230 include a data aggregation setting 233 in addition to the operation mode setting 231 and the destination setting 232 as in Embodiment 1.

The hardware processor 240, the device data manager 250, and the time manager 260 have the same structures and functions as in Embodiment 1.

The structure of the message output command executer 220 is described in detail. As illustrated in FIG. 8, the message output command executer 220 includes a parameter acquirer 221, an operation mode determiner 222, a character string analyzer 223, a character string data generator 224, a data aggregator 226, and a character string data outputter 225.

The parameter acquirer 221 acquires, from the parameter manager 230, the operation mode setting 231 that is a parameter indicating whether the operation mode of the PLC-A 11 is the active mode or the debug mode, the destination setting 232 that is a parameter indicating the message destination based on the message output command, and the data aggregation setting 233 indicating whether the PLC-A 11 performs a data aggregation function. In the present embodiment as well, the parameters managed by the parameter manager 230 may be set or changed as appropriate.

The destination setting 232 specifies any device connected to the PLC-A 11 with the interface in the PLC-A 11 as a message destination. For example, the operation terminal 20 or another external device connected with the connection interface 140 is specified as a destination. In some embodiments, another PLC or an external terminal connected to a network with a communication interface for network connection or connected to a bus with a bus interface may be specified as a destination. In some embodiments, a card connected with a card interface for card connection may be specified as a destination.

As illustrated in FIG. 6, the bus interface 170 in the PLC-A 11 and a bus interface 171 in the PLC-B 12 are connected to each other. When the destination setting 232 managed by the parameter manager 230 in the PLC-B 12 indicates the PLC-A 11, the PLC-B 12 can transmit the character string data generated by the PLC-B 12 to the PLC-A 11.

The communication interface 180 in the PLC-A 11 and a communication interface 182 in the PLC-C 13 are connected to each other. When the destination setting 232 managed by the parameter manager 230 in the PLC-C 13 indicates the PLC-A 11, the PLC-C 13 can transmit character string data generated by the PLC-C 13 to the PLC-A 11.

The operation mode determiner 222, the character string analyzer 223, and the character string data generator 224 operate in the same manner as in Embodiment 1.

When the data aggregation setting 233 acquired from the parameter manager 230 is set to perform aggregation of data, the data aggregator 226 aggregates and sorts character string data generated by the character string data generator 224 and character string data received from the PLC-B 12 and the PLC-C 13. The character string data outputter 225 transmits, to the destination indicated by the destination setting 232 acquired from the parameter manager 230, character string data resulting from the aggregation by the data aggregator 226.

Figure 9:
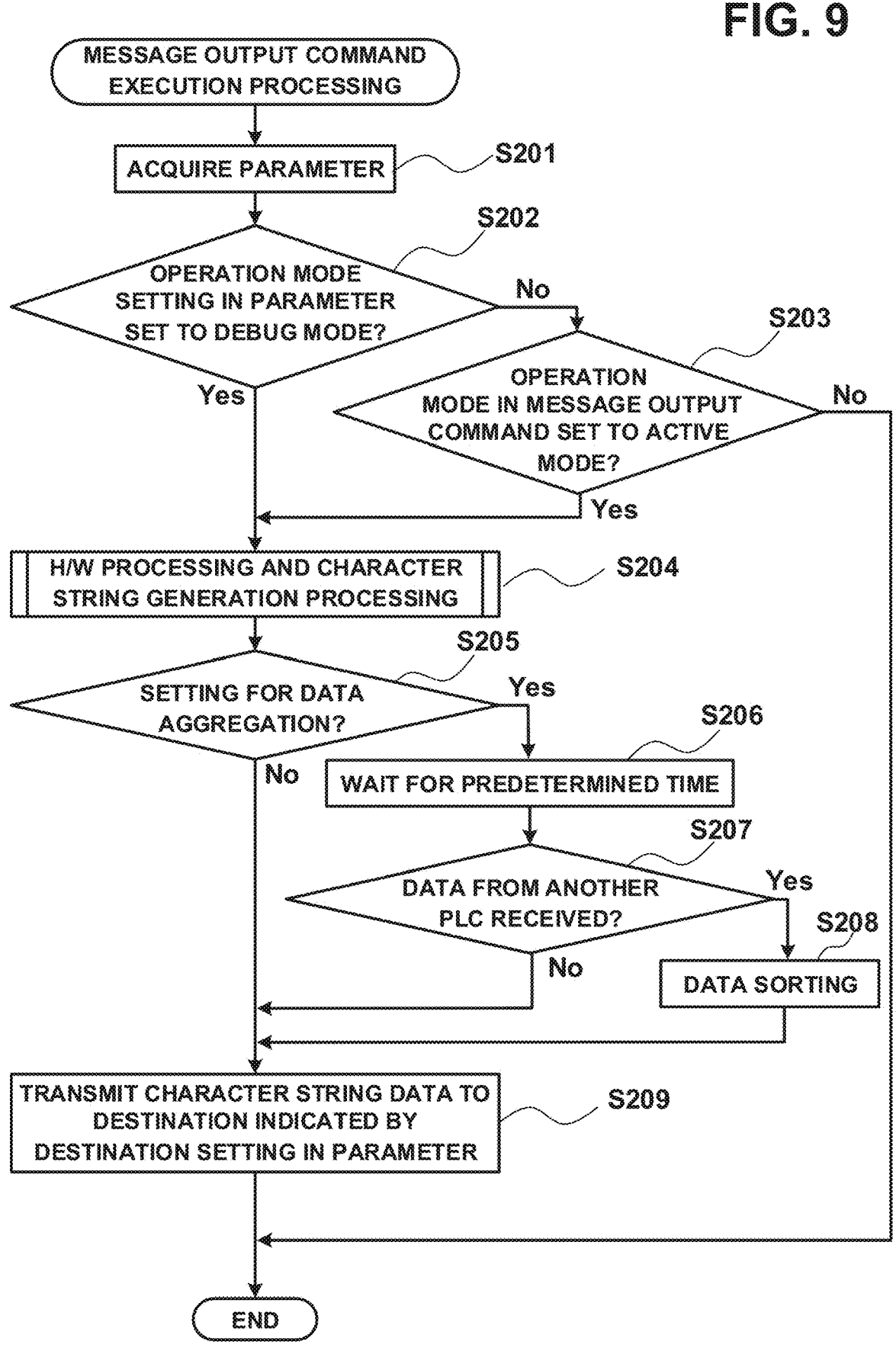
FIG. 9 is a flowchart of message output command execution processing.

The operation of the PLC-A 11 with the above structure is described with reference to the flowchart illustrated in FIG. 9. FIG. 9 is a flowchart of the message output command execution processing in the present embodiment.

The program executer 210 in the PLC-A 11 executes the user program, and sequentially processes the commands. The message output command executer 220 performs the processing in the flowchart in FIG. 9 in response to the message output command. First, the parameter acquirer 221 acquires, from the parameter manager 230, various parameters including the operation mode setting 231, the destination setting 232, and the data aggregation setting 233 (step S201).

The operation mode determiner 222 then compares the operation mode setting 231 included in the parameters acquired by the parameter acquirer 221 with the first argument indicating the operation mode of the message output command. When the operation mode setting 231 in the parameters acquired by the parameter acquirer 221 is the debug mode (Yes in step S202), the hardware processing and the character string generation processing are performed (step S204).

When the operation mode setting 231 in the parameters acquired by the parameter acquirer 221 is the active mode (No in step S202) a determination is made on whether the operation mode corresponding to the first argument in the message output command is the active mode and agrees with the operation mode setting 231 in the parameters (step S203).

When the operation mode corresponding to the first argument in the message output command is the active mode and agrees with the operation mode setting 231 in the parameters (Yes in step S203), the hardware processing and the character string generation processing are performed (step S204). When the operation mode corresponding to the first argument in the message output command is the debug mode and disagrees with the operation mode setting 231 in the parameters (No in step S203), the processing ends.

The hardware processing and the character string generation processing in step S204 are the same as in Embodiment 1. The hardware processor 240 performs the processing in accordance with the flowchart in FIG. 4 to generate character string data.

Subsequently, when the data aggregation setting 233 in the parameters acquired by the parameter acquirer 221 in step S201 is set to perform aggregation of data (Yes in step S205), after waiting for a predetermined time (step S206), the data aggregator 226 determines whether character string data from the PLC-B 12 and the PLC-C 13 is received (step S207).

When character string data from the PLC-B 12 and the PLC-C 13 is received (Yes in step S207), aggregation and sorting of the character string data generated in step S204 and the character string data received from the PLC-B 12 and the PLC-C 13 are performed (step S208). The sorting of the data is performed in accordance with an appropriate rule, for example, in time descending order or in a predetermined PLC sequence. The rule of the sorting may be set by the user.

When the data aggregation setting 233 in the parameters is not set to perform aggregation of data (No in step S205), the processing advances to step S209. When the data aggregation setting 233 in the parameters is set to perform aggregation of data (Yes in S205), but character string data from the PLC-B 12 and the PLC-C 13 is not received within a predetermined time (No in step S207), the processing advances to step S209.

The character string data outputter 225 transmits, to a destination indicated by the destination setting 232 in the parameters acquired from the parameter manager 230, the character string data generated by the character string data generator 224 in step S204 or the character string data resulting from the aggregation by the data aggregator 226 in step S208 (step S209).

As described above, the parameter manager 230 in the PLC-A 11 in the present embodiment manages, in addition to the operation mode setting 231 and the destination setting 232, the data aggregation setting 233 indicating whether the PLC-A 11 is to aggregate data. When the data aggregation setting 233 in the parameters is set to perform aggregation of data, the data aggregator 226 aggregates the character string data received from the PLC-B 12 and the PLC-C 13, and outputs the resultant character string data to the predetermined destination.

Thus, simply using a single operation terminal 20 allows viewing of a message serving as character string data generated by multiple PLCs. In particular, independently of when a manufacturing line has a physical distance and the multiple PLCs are spaced apart, the messages from the different PLCs can be viewed at the same time. In this case, the messages of the PLCs including no interface connected to the operation terminal 20 can be also acquired. In a system including multiple PLCs cooperating with one another to control the entire manufacturing line, sorting data in a time series enables correctly outputting events at occurrence of an abnormality in a time series, facilitating identification of the causes of such events.

MODIFICATION

The above embodiments may be modified in various manners.

For example, in Embodiments 1 and 2, the parameter manager 230 or the device data manager 250 manages the parameters or the device data stored in the volatile memory 120 or the nonvolatile memory 130 in each of the PLC 10, the PLC-A 11, the PLC-B 12, and the PLC-C 13. In some embodiments, the parameter manager 230 or the device data manager 250 may manage the parameters or the device data stored in a storage device connected to an external device.

In Embodiments 1 and 2, when the message output command includes a specific character string, the character string analyzer 223 causes the hardware processing to be performed. The character string data generator 224 then generates character string data, and the character string data outputter 225 outputs the character string data. However, to execute the message output command simply for the hardware processing, the generation and output of the character string data may be skipped.

Although the data aggregation setting 233 in the parameter manager 230 is used to determine whether to aggregate data in Embodiment 2, the aggregation setting 233 is not a necessary parameter. Each PLC may perform data aggregation when receiving character string data from another PLC, and output the aggregated data.

In Embodiment 2, the PLC-A 11 and the PLC-B 12 are connected to each other, the PLC-A 11 and the PLC-C 13 are connected to each other, and the PLC-A 11 directly receives character string data from the PLC-B 12 and the PLC-C 13.

In some embodiments, the PLC-A 11 may receive data through another PLC. For example, the PLC-B 12 may receive character string data from the PLC-C 13. The PLC-A 11 may receive and aggregate data resulting from aggregation of the character string data from the PLC-B 12 and character string data from the PLC-C 13.

The hardware configuration of the PLC 10, the PLC-A 11, the PLC-B 12, and the PLC-C 13 and content of the program processing described in the above embodiments are mere examples, and may be changed or modified as appropriate. The functions implemented by a program may be implementable by a common computer system, rather than by a dedicated system. Further, the processing implemented by the PLC 10, the PLC-A 11, the PLC-B 12, and the PLC-C 13 may be implementable by an engineering tool for designing a PLC.

A program for performing the operations described in the above embodiments may be stored in a non-transitory computer-readable recording medium such as a compact disc read-only memory (CD-ROM), a digital versatile disc (DVD), a magneto-optical (MO) disk, or a memory card for distribution, and may be installed on a computer to implement the above functions. In the system with the functions implementable by the operating system (OS) and an application in a shared manner or through cooperation between the OS and the application, portions executable by the application other than the OS may be stored in a non-transitory recording medium.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

10 Programmable controller (PLC)
11 PLC-A
12 PLC-B
13 PLC-C
20 Operation terminal
30 Target device
100 PLC common block
110 MPU
120 Volatile memory
130 Nonvolatile memory
140 Connection interface
150, 151 Input-output interface
160 Bus
170, 171, 172 Bus interface
180, 182 Communication interface
210 Program executer
220 Message output command executer
221 Parameter acquirer
222 Operation mode determiner
223 Character string analyzer
224 Character string data generator
225 Character string data outputter
226 Data aggregator
230 Parameter manager
231 Operation mode setting
232 Destination setting
233 Data aggregation setting
240 Hardware processor
250 Device data manager
260 Time manager

The invention claimed is:

1. A programmable controller, comprising:
a storage; and
processing circuitry to
manage a parameter including an operation mode setting indicating whether an operation mode of the programmable controller is an active mode or a debug mode, and
output character string data based on a message output command included in a program in the programmable controller, wherein
the processing circuitry outputs the character string data to a preset destination or does not output the character string data, based on the operation mode setting.

2. The programmable controller according to claim 1, wherein
the parameter managed by the processing circuitry further includes a destination setting specifying the destination of the character string data, and
the processing circuitry outputs the character string data to the destination indicated by the destination setting.

3. The programmable controller according to claim 2, wherein the destination indicated by the destination setting includes another programmable controller connected to the programmable controller with an interface included in the programmable controller.

4. The programmable controller according to claim 3, wherein
when character string data is received from the another programmable controller through the interface, the processing circuitry aggregates the received character string data, and
the character string data output by the processing circuitry includes character string data resulting from the aggregation by the processing circuitry.

5. The programmable controller according to claim 4, wherein
the parameter managed by the processing circuitry further includes a data aggregation setting indicating whether the aggregation of the character string data received from the another programmable controller is to be performed, and
the processing circuitry aggregates the character string data received from the another programmable controller when the data aggregation setting is set to perform the aggregation.

6. The programmable controller according to claim 4, wherein the parameter managed by the processing circuitry is changeable with operation input on an operation terminal or a device that is connected to the programmable controller.

7. The programmable controller according to claim 4, wherein
the processing circuitry
analyzes a character string included in the message output command and determines whether the character string includes a predetermined specific character string, and
performs predetermined hardware processing when determining that the character string includes the specific character string.

8. The programmable controller according to claim 3, wherein the parameter managed by the processing circuitry is changeable with operation input on an operation terminal or a device that is connected to the programmable controller.

9. The programmable controller according to claim 3, wherein
the processing circuitry
analyzes a character string included in the message output command and determines whether the character string includes a predetermined specific character string, and
performs predetermined hardware processing when determining that the character string includes the specific character string.

10. The programmable controller according to claim 3, wherein
the processing circuitry
acquires device data that is data about a device located inside or outside the programmable controller based on a character string included in the message output command, and generates character string data including the device data, and
outputs, to the destination, the character string data generated by the processing circuitry.

11. The programmable controller according to claim 2, wherein the parameter managed by the processing circuitry is changeable with operation input on an operation terminal or a device that is connected to the programmable controller.

12. The programmable controller according to claim 2, wherein
the processing circuitry
analyzes a character string included in the message output command and determines whether the character string includes a predetermined specific character string, and
performs predetermined hardware processing when determining that the character string includes the specific character string.

13. The programmable controller according to claim 2, wherein
the processing circuitry
acquires device data that is data about a device located inside or outside the programmable controller based on a character string included in the message output command, and generates character string data including the device data, and
outputs, to the destination, the character string data generated by the processing circuitry.

14. The programmable controller according to claim 1, wherein the parameter managed by the processing circuitry is changeable with operation input on an operation terminal or a device that is connected to the programmable controller.

15. The programmable controller according to claim 1, wherein
the processing circuitry
analyzes a character string included in the message output command and determines whether the character string includes a predetermined specific character string, and
performs predetermined hardware processing when determining that the character string includes the specific character string.

16. The programmable controller according to claim 1, wherein
the processing circuitry
acquires device data that is data about a device located inside or outside the programmable controller based on a character string included in the message output command, and generates character string data including the device data, and
outputs, to the destination, the character string data generated by the processing circuitry.

17. The programmable controller according to claim 1, wherein
the message output command includes a first argument specifying whether a command is to be executed when the operation mode is the active mode or to be executed when the operation mode is the debug mode, and
the processing circuitry outputs the character string data to the preset destination or does not output the character string data, based on a result of a comparison between the operation mode setting and the first argument.

18. The programmable controller according to claim 17, wherein
the processing circuitry
outputs the character string data to the preset destination when the operation mode setting is set to indicate the debug mode,
outputs the character string data to the preset destination when the operation mode setting is set to indicate the active mode and the first argument is a value corresponding to the active mode, and
does not output the character string data when the operation mode setting is set to indicate the active mode and the first argument is a value corresponding to the debug mode.

19. A programmable controller system, comprising:
a plurality of programmable controllers, each of the plurality of programmable controllers including
a storage, and
processing circuitry to
manage a parameter including (i) a destination setting specifying a destination to which character string data is output based on a message output command included in a program in the programmable controller and (ii) an operation mode setting indicating whether an operation mode of the programmable controller is an active mode or a debug mode, and
output the character string data based on the message output command to the destination indicated by the destination setting, wherein
the destination indicated by the destination setting includes another programmable controller connected to the programmable controller with an interface included in the programmable controller, and
the processing circuitry outputs the character string data to a preset destination or does not output the character string data, based on the operation mode setting.

20. A non-transitory computer-readable recording medium storing a program for causing a programmable controller to execute processing, the processing comprising:
managing a parameter including an operation mode setting indicating whether an operation mode of the programmable controller is an active mode or a debug mode;
outputting character string data based on a message output command; and
outputting the character string data to a preset destination or not outputting the character string data, based on the operation mode setting.

\* \* \* \* \*